United States Patent
Oouchida et al.

(10) Patent No.: US 9,030,359 B2
(45) Date of Patent: May 12, 2015

(54) COMMUNICATION SHEET STRUCTURE AND INFORMATION MANAGEMENT SYSTEM

(75) Inventors: Machiko Oouchida, Ibaraki (JP); Seiji Ito, Ibaraki (JP)

(73) Assignee: Teijin Fibers Limited, Osaka (JP)

( * ) Notice: Subject to any disclaimer, the term of this patent is extended or adjusted under 35 U.S.C. 154(b) by 626 days.

(21) Appl. No.: 13/500,153

(22) PCT Filed: Oct. 4, 2010

(86) PCT No.: PCT/JP2010/067386
§ 371 (c)(1),
(2), (4) Date: Apr. 4, 2012

(87) PCT Pub. No.: WO2011/043305
PCT Pub. Date: Apr. 14, 2011

(65) Prior Publication Data
US 2012/0194300 A1    Aug. 2, 2012

(30) Foreign Application Priority Data
Oct. 5, 2009  (JP) .................................. 2009-231622

(51) Int. Cl.
*H01Q 1/38* (2006.01)
*H04B 13/00* (2006.01)

(52) U.S. Cl.
CPC ...................................... *H04B 13/00* (2013.01)

(58) Field of Classification Search
CPC ........... H01Q 1/38; H01Q 1/40; H04B 13/00; H04B 5/02
USPC .................................... 343/700 MS, 897, 872
See application file for complete search history.

(56) References Cited

U.S. PATENT DOCUMENTS 8,487,831 B2 *  7/2013  Yoshida et al. ................ 343/904
8,564,472 B2 * 10/2013  Okamura et al. .................. 342/1

FOREIGN PATENT DOCUMENTS

| | | |
|---|---|---|
| JP | 2009-217973 A | 9/2009 |
| JP | 2010-21737 A | 1/2010 |
| JP | 2010-114696 A | 5/2010 |
| WO | 2007/066405 A1 | 6/2007 |
| WO | 2009/157095 A1 | 12/2009 |
| WO | 2010/052818 A1 | 5/2010 |

OTHER PUBLICATIONS

International Search Report of PCT/JP2010/067386 dated Nov. 2, 2010.

* cited by examiner

*Primary Examiner* — Hoang V Nguyen
(74) *Attorney, Agent, or Firm* — Sughrue Mion, PLLC

(57) ABSTRACT

A communication sheet structure includes at least three layers of a conductor layer A, a base member layer and a conductor layer B, which are laminated in order, wherein the size of the communication sheet structure in the direction of width thereof at right angles with the direction in which the transmitted electromagnetic waves travel in a plane thereof is nearly equal to a natural number of times of one-half the wavelength of the transmitted electromagnetic waves so as to establish a resonating state in the direction of width.

13 Claims, 6 Drawing Sheets

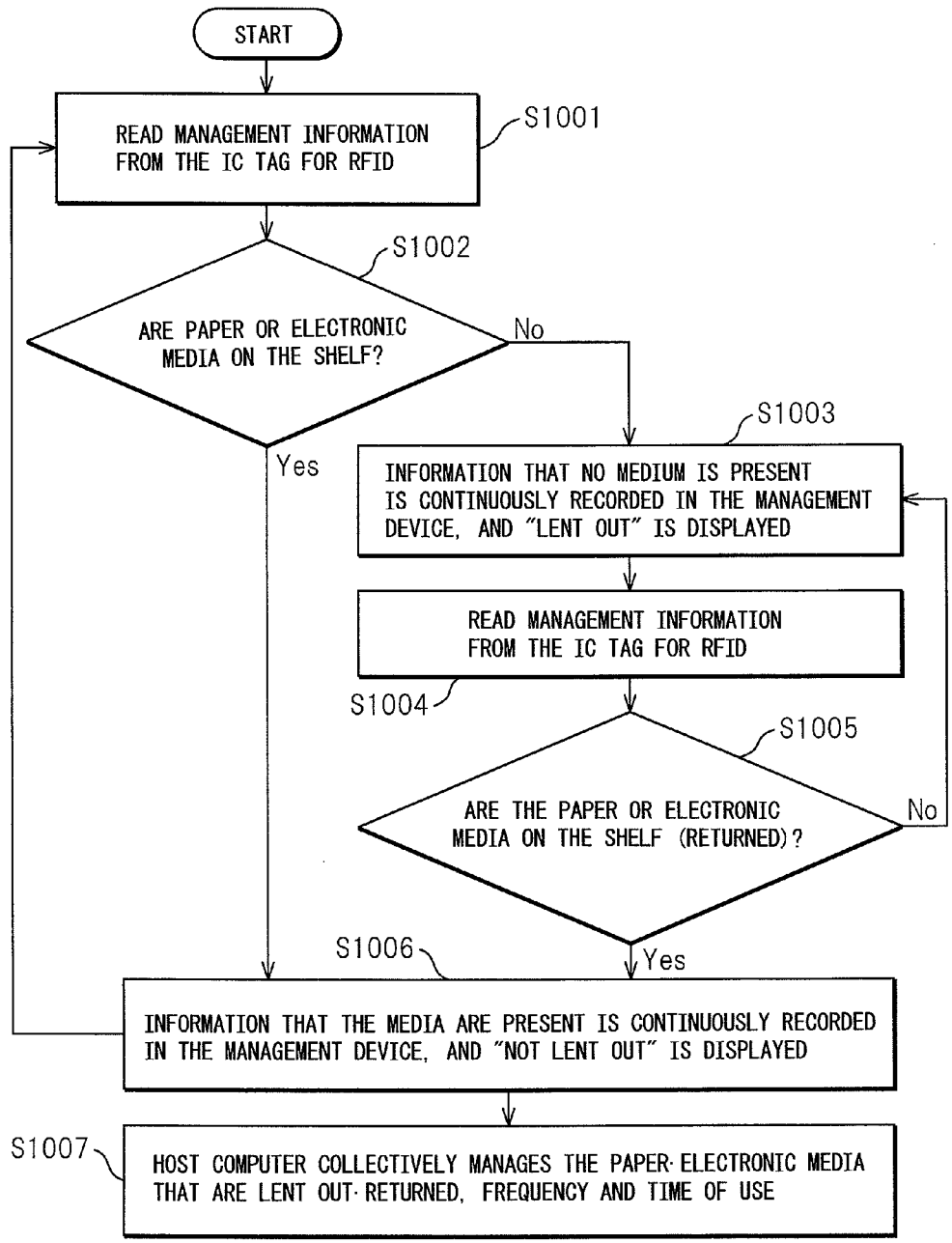

COMMUNICATION SHEET STRUCTURE AND INFORMATION MANAGEMENT SYSTEM

TECHNICAL FIELD

This invention relates to a communication sheet for executing communications by transmitting electromagnetic waves. More specifically, the invention relates to a communication sheet structure having a two-dimensional expansion used for an RFID (Radio Frequency Identification) system which, when an information communication device is brought in contact with, or is brought close to, the surface thereof, is best adapted to executing communications with the communication device or, when a plurality of information communication devices are brought in contact with, or are brought close to, the surface thereof, is best adapted to repeating the communications among the plurality of information communication devices, and to an information management system using the sheet structure.

BACKGROUND ART

Recently, use of computer communication networks and information networks via the Internet is becoming common practice, is spreading and is increasing among general households and enterprises. The most general use may be to form a LAN (Local Area Network) by connecting a LAN cable to a personal computer directly or by using radio waves enabling the network such as the Internet accessible from a computer in the LAN. When the LAN cable is used in such circumstances, the cable that is drawn in the house or office becomes an obstacle against walking or casts a problem from the standpoint of appearance. When the wireless LAN is used, on the other hand, the communication based on the radiation of electromagnetic waves causes a problem of security, such as leakage of information, unauthorized access, etc.

A patent document 1 (Kokai (Japanese Unexamined Patent Publication) No. 2004-7448) and a patent document 2 (Kokai (Japanese Unexamined Patent Publication) No. 2006-19979) are teaching that these problems can be solved by using a two-dimensional communication medium as communication means.

In recent years, an article management using IC tag for RFID is drawing attention as a new network system. In the field of distribution, for example, there has been proposed an art of sticking IC tags for RFID to the products in the step of production in a factory and tracing the flow of the articles in a subsequent route of distribution, offering expectations of rationalization of production, efficiency of distribution management and reduction of cost. In the step of production, a proposal has also been made to record the history information for every movement and work concerning where the parts have passed through, how the parts were worked and to where the parts were shipped. There can be, further, exemplified management of book stock in the libraries as well as management of documents in the offices, management of goods in the stores and management of chemicals in the research facilities, and it is expected that the use of the RFID system will rapidly spread in the future.

However, when the articles are to be managed by using the IC tags for RFID, shelves having a function of antenna must be newly introduced requiring a large system and posing a problem from the standpoint of introducing and installing the system.

PRIOR ART DOCUMENTS

Patent Documents

Patent document 1: Kokai (Japanese Unexamined Patent Publication) No. 2004-7448
Patent document 2: Kokai (Japanese Unexamined Patent Publication) No. 2006-19979

SUMMARY OF THE INVENTION

Problems that the Invention is to Solve

The object of the present invention is to provide a communication sheet structure that is used in combination with an IC tag, has stable read rate and can be easily introduced and installed on an existing shelf, and also an information management system using the same.

Means for Solving the Problems

The present inventors have conducted study in order to solve the above problems and have discovered that the problems can be solved by the communication sheet structure described below.

Namely, according to the present invention, there is provided a communication sheet structure comprising at least three layers of a conductor layer A, a base member layer and a conductor layer B described below, which are laminated in order, wherein the size of the communication sheet structure in the direction of width thereof at right angles with the direction in which the transmitted electromagnetic waves travel in a plane thereof is nearly equal to a natural number of times of one-half the wavelength of the transmitted electromagnetic waves so as to establish a resonating state in the direction of width:

conductor layer A: a layer in which continuous, conducting portions A and nonconducting portions A are present, the conducting portions A having an electric resistance of not larger than 1 $\Omega/\square$;

base member layer: a layer of a resin molded body or a fiber structure having a relative dielectric constant of 1.0 to 5.0 at a frequency of 800 MHz to 10 GHz;

conductor layer B: a layer in which a conducting portion B is present over not less than 90% of the area thereof, the conducting portion B having an electric resistance of not larger than 1 $\Omega/\square$.

According to the present invention, further, there is provided an information management system comprising an IC tag for storing information related to an article which is to be managed, the above communication sheet structure, and a transmission/reception unit which transmits electromagnetic waves toward the communication sheet structure and receives signals from the IC tag through the communication sheet structure.

Effects of the Invention

The communication sheet structure of the present invention can be easily introduced and installed on an existing shelf, and contributes to developing the management of articles, such as management of book stock in the libraries, as well as management of documents in the offices, management of goods in the stores and management of chemicals in the research facilities.

BRIEF DESCRIPTION OF THE DRAWINGS:

[FIG. 11] is a flowchart illustrating a flow of operation of the book management system of FIGS. 9 and 10.

Figure 1:
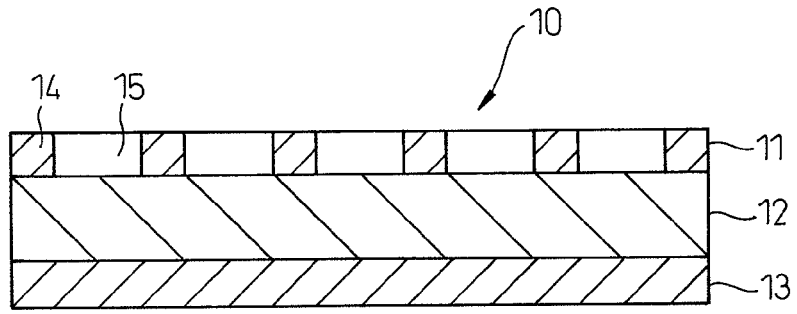
[FIG. 1] is a schematic transverse sectional view of a communication sheet structure according to an embodiment of the invention.

DESCRIPTION OF REFERENCE NUMERALS 10, 20, 30, 40, 50 communication sheet structures
11, 21, 31, 41 conductor layers A
12, 22, 32, 42 base member layers
13, 23, 33, 43 conductor layers B
14, 24, 34, 44, 54 conducting portions A
15, 25, 35, 45, 55 nonconducting portions A
26, 46 protection layers A
27, 37, 47 protection layers B
38, 48 high dielectric constant layers
59 connector
100 information management system
111, 111-1, 111-2, 11-3, 111-4, 111-5, 111-6, 111-7, 111-8 communication sheet structures
112, 112-1, 112-2, 112-3, 112-4 IC tags for RFID
113 transmission/reception unit
114 managing device
115 host computer
121 input/output interface
131, 131-1, 131-2, 131-3, 131-4 articles to be managed Modes for Carrying out the Invention:

The invention will now be described in detail with reference to the drawings.

As shown in FIG. 1, the communication sheet structure for use in the RFID system of the invention (hereinafter often simply referred to as communication sheet structure or sheet structure) 10 comprises at least three layers of a conductor layer A 11, a base member layer 12 and a conductor layer B 13 described below, which are laminated in order. The three layer constitution makes it possible to confine electromagnetic energy in the sheet structure and to utilize it for the communications.

Conductor layer A 11:

A layer in which continuous, conducting portions A 14 and nonconducting portions A 15 are present, the conducting portions A having an electric resistance of, preferably, not larger than 1 Ω/□, to make it possible to maintain a good communication state. If the electric resistance of the conducting portions A 14 in the conductor layer A 11 exceeds 1 Ω/□, it becomes difficult to transmit and confine the electromagnetic energy in the sheet structure, and the two-dimensional communication becomes insufficient.

To impart the above conducting properties to the conductor layer A 11, a material having conducting property may be used as the conductor A for constituting the conducting portions A 14. Preferred examples of the material include those which contain such metals as copper, silver, aluminum, stainless steel and nickel. The electric resistance of the conducting portions A 14 is preferably from 0.001 Ω/□ to 0.5 Ω/□.

Though there is no specific limitation, it is desired that the conducting portions A 14 of the conductor layer A 11 are formed in the shape of a lattice or a honeycomb (honeycomb structure) from the standpoint of workability in producing the communication sheet structure 10. Of them, particularly preferred is the lattice shape having a width of lattice wire of 0.5 mm to 1.5 mm and a gap among the lattice wires of 5 mm to 10 mm.

The thickness of the conducting portions A 14 in the conductor layer A 11 is, desirably, larger than the depth of surface skin of the conductor that corresponds to the frequency of electromagnetic waves transmitted through the communication sheet structure. This enables the electromagnetic waves to be easily confined in the communication sheet structure. The thickness of the conducting portions A 14 in the conductor layer A 11 is, preferably, from 0.0001 µm to 50 µm and, more preferably, from 1 µm to 25 µam.

Base Member Layer 12:

The base member layer 12 comprises a resin molded body or a fiber structure having a relative dielectric constant of 1.0 to 5.0 and, preferably, 1.0 to 3.0 at a frequency of 800 MHz to 10 GHz. By using the base member having the above characteristics, the communication sheet structure 10 suppresses the attenuation of electromagnetic waves transmitting through the sheet, and exhibits very excellent two-dimensional communication performance.

As the material for constituting the base member while satisfying the relative dielectric constant, there can be exemplified olefin resin (TPO), styrene resin (SBC), vinyl chloride resin (TPVC), urethane resin (PU), ester resin (TPE), amide resin (TPAE), and fluorinated resin (PTFE). Among them, from the standpoint of relative dielectric constant and workability, it is preferred to use polyolefins such as polyethylene (PE) and polypropylene (PP); polyesters such as polyethylene terephthalate (PET), polyethylene naphthalate (PEN), polybutylene terephthalate (PBT) and polytrimethylene terephthalate (PTT); and a polyimide (PI). Specifically, it is desired to use polyester and polyolefin.

The base member which is a resin molded body may, preferably, be a porous material such as foamed polyethylene or formed polypropylene having a voidage of 50 to 85%. When made from a porous material, the base member may have increased voids and a relative dielectric constant which is close to 1, making it possible to obtain stable communication performance. The porous material may be either continuously foamed or independently foamed.

The base member which is a fiber structure may, concretely, be a woven fabric, knitted fabric or nonwoven fabric. In this case, a filament has a size of, preferably 0.5 to 30 dtex and, more preferably, 0.5 to 10 dtex. When the base member is a woven fabric or a knitted fabric, further, it is desired to use a multi-filament yarn having a total size of, preferably, 30 to 1500 dtex and, more preferably, 30 to 800 dtex. When the base member is a woven fabric, it is also desired that the woven fabric density is, preferably, 15 to 200 yarns/inch and, more preferably, 15 to 150 yarns/inch as both the warp density and the weft density. Here, the warp density and the weft density may be the same or different.

Further, it is desired that the base member has an elastic property. Examples thereof may be a synthetic rubber sheet and an elastomer fiber structure. As the synthetic rubber sheet, there can be exemplified chloroprene rubber (CR), butyl rubber (IIR), nitrile rubber (NBR), ethylene/propylene rubber (EPM/EPDM), natural rubber (NR), urethane rubber, fluorine-contained rubber and silicone rubber. As the elastomer fiber structure, there can be exemplified woven fabrics, knitted fabrics and nonwoven fabrics using an elastomer fiber and, specifically, a nonwoven fabric having a high voidage. Among them, it is desired to use the elastomer fiber of 0.1 μm to 20 μm. As compared to the flexible communication sheet structure using an ordinary resin sheet, the flexible communication sheet structure using the synthetic rubber sheet or elastomer fiber structure having elastic property excels in flexibility and bend fatigue resistance, and can be repetitively folded or rounded when it is to be stored or transported.

The base member has a thickness of, preferably, 0.2 mm to 10 mm and, more preferably, 0.5 mm to 2.0 mm. Further, the base member has a weight of, preferably, 50 g/m$^2$ to 800 g/m$^2$ and, more preferably, 80 g/m$^2$ to 300 g/m$^2$.

Conductor Layer B 13:

In the conductor layer B 13, a conducting portion B must be present over not less than 90% and, preferably, not less than 95% of the area thereof to maintain a good communication state.

The conductor B constituting the conducting portion B has an electric resistance of, preferably, not larger than 1 Ω/□ and, more preferably, from 0.001 Ω/□ to 0.5 Ω/□. Here, presuming that the electric resistance is not larger than 0.5 Ω/□, it is desired that the conductor B is made of a material containing gold, solver, copper, aluminum, stainless steel or nickel from the standpoint of workability in producing the communication sheet structure.

To impart the above conducting properties to the conductor layer B 13, the material (conductor B) for constituting the layer and having conducting property may be printed, plated, vacuum evaporated or laminated on one surface of the base member. Specifically, the conductor layer B can be thickly and desirably formed by plating or laminating the material that contains the metal such as cupper, silver, aluminum or nickel.

Usually, the conductor layer B 13 has a thickness of, preferably, 0.00001 μm to 50 μm and, more preferably, 1 μm to 25 μm.

Figure 2:
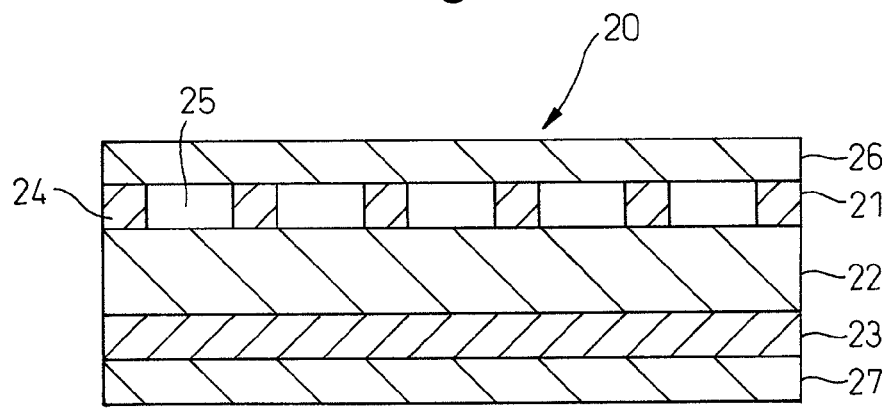
[FIG. 2] is a schematic transverse sectional view of the communication sheet structure according to another embodiment of the invention.

In order to improve durability of the communication sheet structure 20 according to the invention as shown in FIG. 2, it is desired to cover the conductor layer A 21 and the base member 22 with a protection layer A 26 and/or to cover the conductor layer B 23 with a protection layer B 27.

The protection layer A or B may be a resin, sheet or film. Examples thereof include polyester films such as of PET and PEN, polyolefin films such as of PE and PP, such films as polyimide film and ethylene/vinyl alcohol film, and resins such as acrylic resin and urethane resin.

Further, the protection layer A 26 and the protection layer B 27 may be fiber structures such as woven fabrics, knitted fabrics or nonwoven fabrics. As the resin for constituting the fiber, there can be exemplified polyesters such as polyethylene terephthalate (PET), polyethylene naphthalate (PEN), polybutylene terephthalate (PBT) and polytrimethylene terephthalate (PTT); aliphatic polyamides such as nylon 6, nylon 66 and nylon 12; aromatic polyamides such as poly-paraphenyleneterephthalamide and polymetaphenyleneterephthalamide; polypropylene (PP), polyethylene (PE), polycarbonate (PC) and polyimide (PI).

The protection layer A 26 and the protection layer B 27 may be elastomer resins or elastomer nonwoven fabrics as described above. Further, the protection layers A and B may be the same or different.

Thus, when the protection layer A 26 is to be provided, the conductor layer A 21 is formed directly on the base member 22 as described above and, thereafter, the protection layer A 26 is formed thereon or the conductor layer A 21 is directly formed on the protection layer A 26, and the base member 22 is joined to the side of the conductor layer A 21.

When the protection layer B 27 is to be provided, too, the conductor layer B 23 is formed directly on the base member 22 and, thereafter, the protection layer B 27 is formed thereon. Or, the conductor layer B 23 is directly formed on the protection layer B 27, and the base member 22 is joined to the side of the conductor layer B 23 to produce the communication sheet structure 20.

Figure 3:
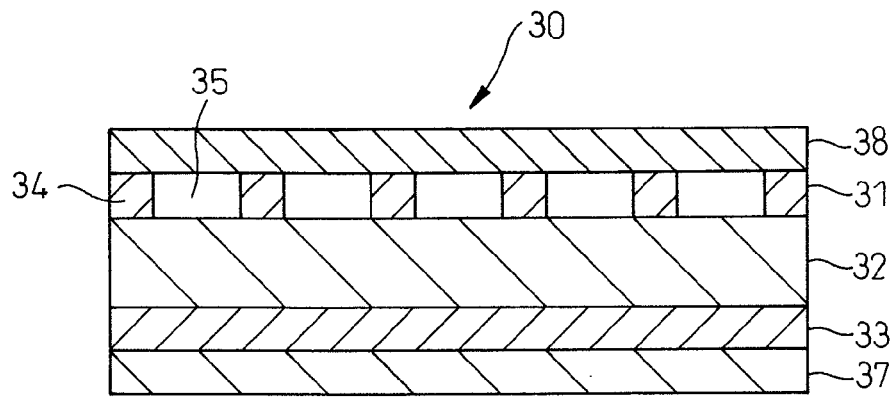
[FIG. 3] is a schematic transverse sectional view of the communication sheet structure according to a further embodiment of the invention.

In the invention as shown in FIG. 3, it is desired that a high dielectric constant layer 38 having a relative dielectric constant higher than that of the base member layer 32 and having a dielectric loss tangent of not larger than 0.001, is laminated on the conductor layer A 31 instead of laminating the above protection layer A. Upon laminating the high dielectric constant layer 38, it was learned that the electromagnetic waves having an increased intensity leak from the nonconducting portions A 35 making it possible to greatly improve performance for reading information from the IC tag for RFID. The difference in the relative dielectric constant between the base member layer 32 and the high dielectric constant layer 38 is better as large as possible and, preferably, not less than 0.2 and, more preferably, not less than 1.0.

The relative dielectric constant of the high dielectric constant layer 38 should satisfy the above condition and should be, preferably, 2.0 to 10.0 and, more preferably, 5.0 to 10.0. If the relative dielectric constant is less than 2.0, the difference from the relative dielectric constant of the base member is not sufficient, and the reading performance tends to decrease. Though the relative dielectric constant is better large, the dielectric loss tangent, on the other hand, must be maintained small to a sufficient degree. It is, therefore, recommended to so select the relative dielectric constant as will not to exceed 10.0.

The thickness of the high dielectric constant layer 38 is, preferably, 1.0 to 5.0 mm and, more preferably, 1.0 to 3.0 mm. If the thickness is smaller than 1.0 mm, the read rate cannot be sufficiently improved. If the thickness exceeds 5.0 mm, on the other hand, the sheet structure 30 has a too large thickness and hinders the handling.

As the high dielectric constant layer 38, there can be exemplified a woven fabric, knitted fabric, nonwoven fabric, resin, sheet and film. Among them, resin, sheet and film are preferred, and the sheet may be the one that has been foamed.

As the polymer for constituting the above resin, sheet and film, there can be exemplified polyesters such as polyethylene terephthalate (PET) and polyethylene naphthalate (PEN); polyolefins such as polyethylene (PE), polypropylene (PP) and polystyrene (PSt); as well as polyimide, ethylene/vinyl alcohol, acryl and urethane.

As the high dielectric constant layer 38, in particular, it is desired to use a film or a sheet of PET, PEN, PP, PE or PSt so as to satisfy both the dielectric constant and the dielectric loss tangent.

Figure 4:
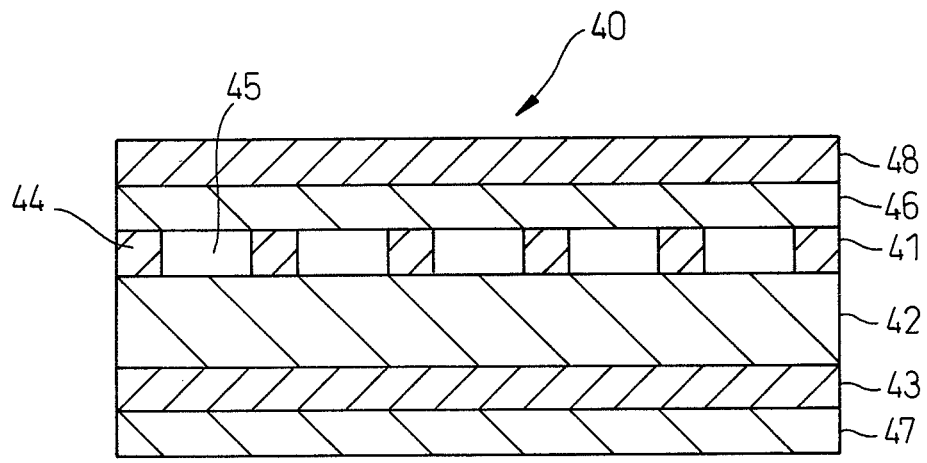
[FIG. 4] is a schematic transverse sectional view of the communication sheet structure according to a further embodiment of the invention.
Figure 5:
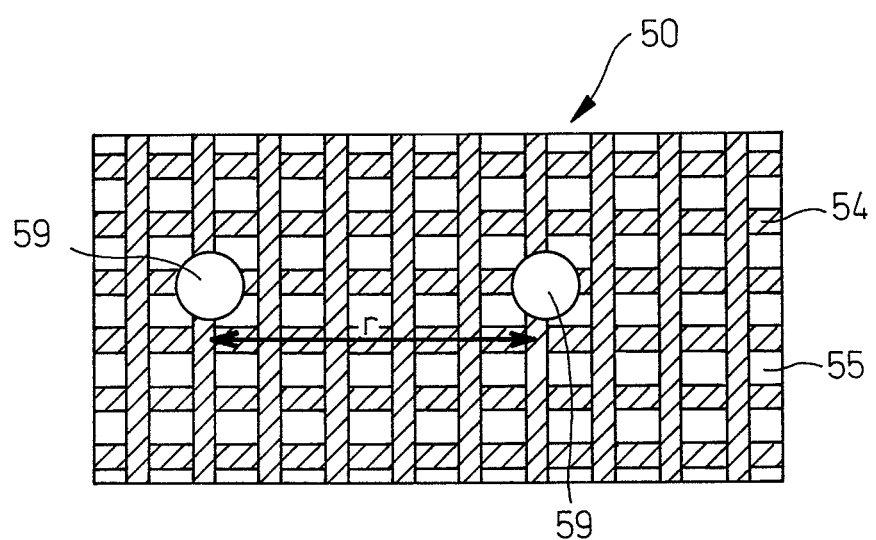
[FIG. 5] is a schematic top view of the communication sheet structure according to the embodiment of the invention.

According to the invention as shown in FIG. 4, further, a protection layer A 46 having a thickness of 0.02 to 0.3 mm may be formed between the conductor layer A 41 and the high dielectric constant layer 48. Namely, in forming the communication sheet structure 40 of the invention, for example, the conductor layer A 41 is not directly laminated on the base member 42 but the conductor layer A 41 may be laminated on a film or a sheet that becomes the protection layer A 46. The conductor layer A 41 may be, thereafter, partly removed by etching and may be worked into the shape of a lattice. Thereafter, the protection layer A 46 may be laminated on the base member 42 in a manner that the conductors A 44 are on the side of the base member 42, and is joined thereto in a customary manner facilitating the fabrication. From the above point of view, therefore, the thickness of the protection layer A 46 is better small and not larger than 0.3 mm. The thickness which is too small, however, makes the handling difficult and desirably, therefore, is not smaller than 0.03 mm.

The protection layer A 46 is, desirably, a resin, sheet or film. As the polymer for constituting it, there can be exemplified polyesters such as polyethylene terephthalate and polyethylene naphthalate; polyolefins such as polyethylene (PE), polypropylene (PP) and polystyrene (PSt); as well as polyimide, ethylene/vinyl alcohol, acryl and urethane.

The communication sheet structure of the invention must have a size in the direction of width thereof at right angles with the direction in which the transmitted electromagnetic waves travel in a plane thereof of nearly equal to a natural number of times of one-half the wavelength of the electromagnetic waves and, specifically, nearly equal to one-half the wavelength of the electromagnetic waves. This makes it possible to efficiently resonate the electromagnetic waves in the direction of width and to transmit the electromagnetic waves highly efficiently with low loss, and to increase the intensity of the whole electromagnetic waves leaking through the lattice-like conductor layer A. The above sheet structure can be used as a communication sheet structure for RFID since the electromagnetic waves of an increased intensity leaks out from the lattice-like conductor layer A; i.e., the sheet structure can be used to execute communication with an IC tag for RFID placed on the communication sheet structure.

It is desired that the communication sheet structure of the present invention is of the shape of a strip having a long side in the direction in which the transmitted electromagnetic waves travel and a short side in the direction of width thereof.

The communication sheet structure of the invention can be provided with an input interface which permit the transmitted electromagnetic waves to be input thereto so as to be transmitted in a predetermined traveling direction.

An information management system of the invention is a system comprising the above communication sheet structure having a transmission/reception unit connected to the input/output interface to transmit communication electromagnetic waves, and an IC tag for RFID. Usually, a reader/writer which reads and writes data to and from the IC tag for RFID includes an antenna and a transmission/reception unit for transmitting and receiving signals through the antenna. The communication sheet structure of the invention has a function of the antenna of the reader/writer. Namely, in the invention, the transmission/reception unit in the reader/writer generates electromagnetic waves toward the IC tag for RFID through the communication sheet structure, the IC tag for RFID receives the electromagnetic waves and generates predetermined signals therein, and the transmission/reception unit in the reader/writer receives the signals through the communication sheet structure. The transmission/reception unit is capable of transmitting and receiving communication electromagnetic waves to and from the IC tag for RFID through the communication sheet structure.

Figure 6:
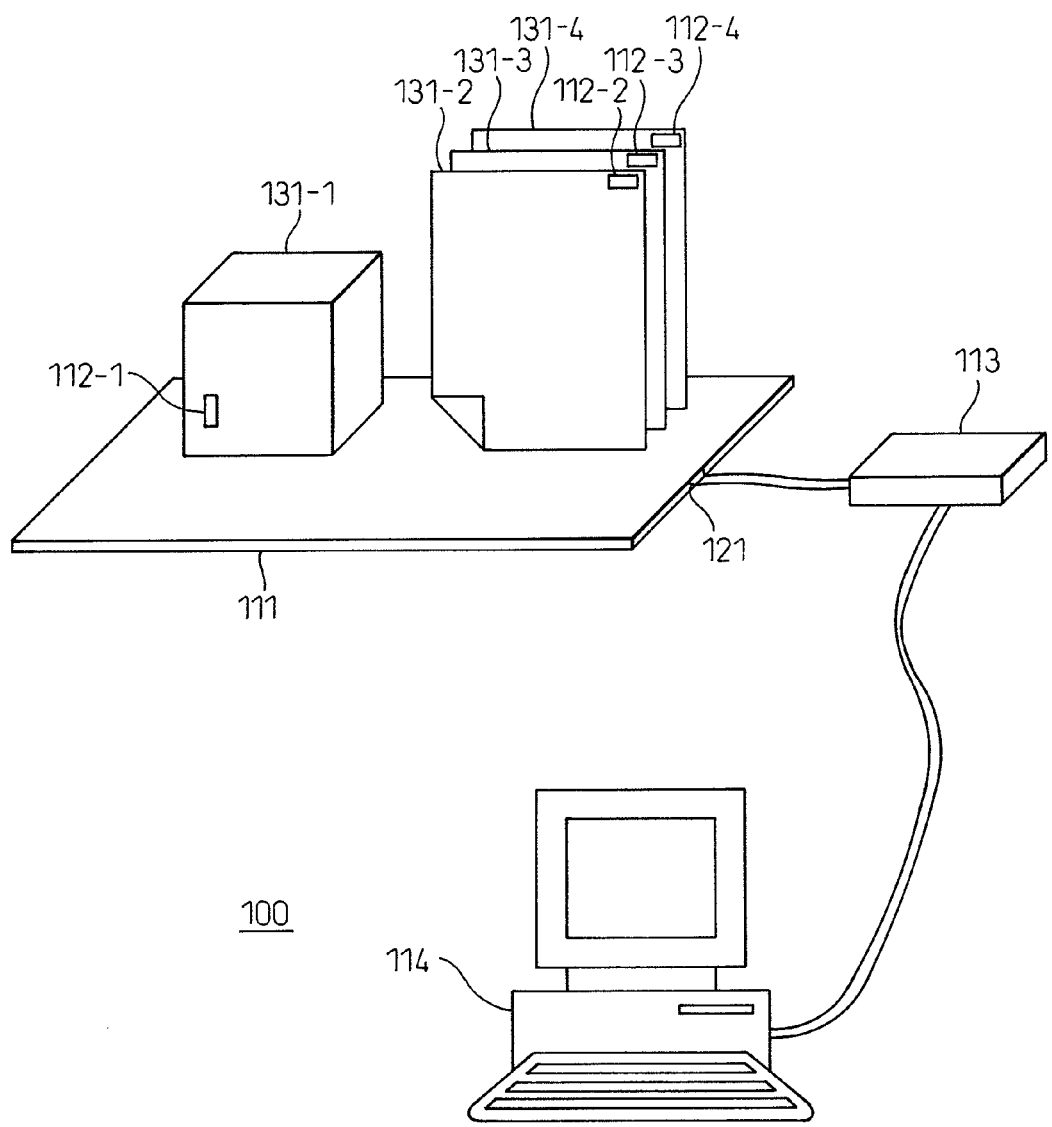
[FIG. 6] is a schematic view of an information management system of the invention.

FIG. 6 is a schematic view of the information management system of the invention. The information management system 100 of the invention comprises IC tags 112-1, 112-2, 112-3 and 112-4 for RFID for storing information related to articles 131-1, 131-2, 131-3 and 131-4 that are to be managed, a communication sheet structure 111, and a transmission/reception unit 113 which transmits electromagnetic waves toward the communication sheet structure 111 and receives signals from the IC tags 112-1, 112-2, 112-3 and 112-4 for RFID through the communication sheet structure 111. The function of a so-called reader/writer is constituted by the communication sheet structure 111 and the transmission/reception unit 113. FIG. 6 shows the articles to be managed in a number of four which, however, is merely an example, and the number is not limited thereto only. Further, the IC tags for RFID are put to the articles that are to be managed. Therefore, the number of the IC tags for RFID varies depending on the number of the articles.

The information management system 100, further, includes a management device 114 which reads information related to the articles 131-1, 131-2, 131-3 and 131-4 to be managed based on the signals received by the transmission/reception unit 113, and manages the states of the articles by the database relying on the management information that has been registered in advance and the information related to the articles that is read out. The transmission/reception unit 113 is connected to the communication sheet structure 111 through the input/output interface 121, and is connected to the management device 114 through a cable. The management device 114 is constituted by a dedicated computer or a general-purpose computer. The management device 114 includes a CPU (Central Processing Unit), a ROM (Read Only Memory), a RAM (Random Access Memory), a display unit and an input unit or the management device 114 may be incorporated in a variety of existing electronic equipment.

Figure 7:
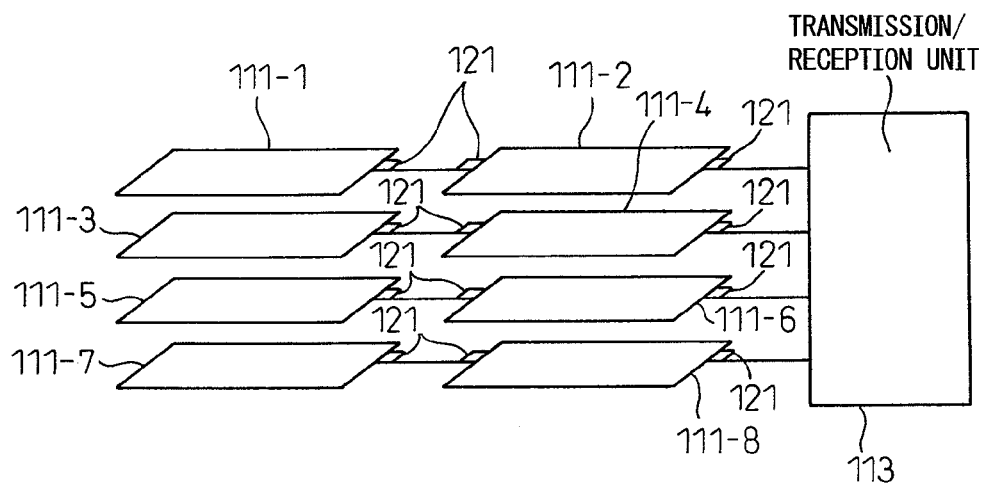
[FIG. 7] is a view of an example where a plurality of pieces of communication sheet structures are connected in the information management system of the present invention (part 1).
Figure 8:
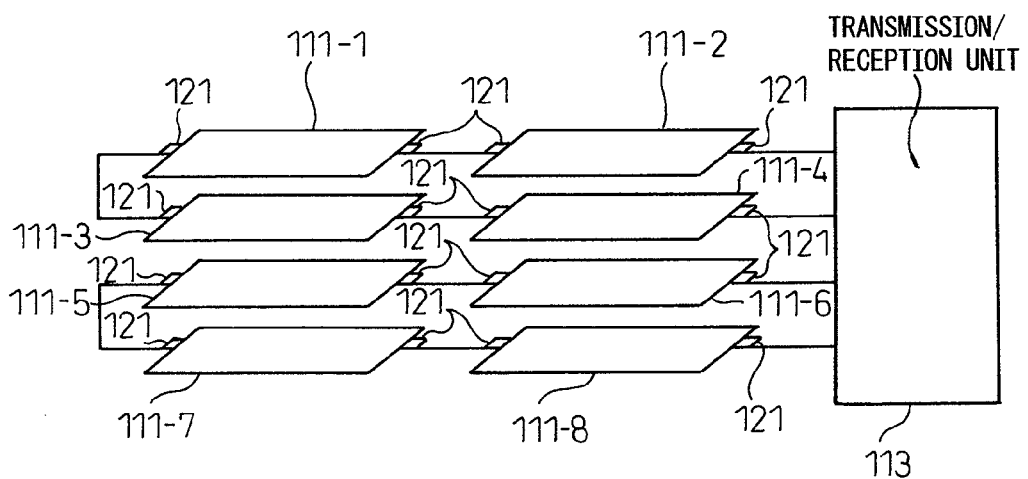
[FIG. 8] is a view of an example where a plurality of pieces of communication sheet structures are connected in the information management system of the present invention (part 2).

The communication sheet structure 111 includes an input/output interface 121 to which the transmission/reception unit 113 or another communication sheet structure (not shown) is connected to input and output signals. A plurality of communication sheet structures 111 can be connected to each other through the input/output interface 121. FIGS. 7 and 8 are views of when a plurality of pieces of communication sheet structures are connected in the information management system of the present invention. In an example shown in FIG. 7, a communication sheet structure 111-2 to which a communication sheet structure 111-1 is connected,
a communication sheet structure 111-4 to which a communication sheet structure 111-3 is connected,
a communication sheet structure 111-6 to which a communication sheet structure 111-5 is connected, and
a communication sheet structure 111-8 to which a communication sheet structure 111-7 is connected, are connected to the transmission/reception unit 113, and the communication sheet structures 111-1, 111-3, 111-5 and 111-7 are so connected as to become terminals. In an example shown in FIG. 8, further, the communication sheet structures 111-2, 111-1, 111-3 and 111-4 are connected in this order, and the communication sheet structures 111-2 and 111-4 are connected to the transmission/reception unit 113. Further, the communication sheet structures 111-6, 111-5, 111-7 and 11-8 are connected in this order, and the communication sheet structures 111-6 and 111-8 are connected to the transmission/reception unit 113. FIGS. 7 and 8 show the examples where 8 pieces of the communication sheet structures are connected. However, the number of pieces and connections, are merely examples, and any other numbers of pieces and connections may be employed or may be suitably set to meet a concrete embodiment to which the information management system 100 is applied. The communication sheet structure 111 is placed on a plane where there are placed an articles to be managed to which the IC tags for RFID are attached, and its details will be described in a concrete embodiment of application appearing later.

The IC tags 112-1, 112-2, 112-3 and 112-4 for RFID in the information management system of the invention shown in FIG. 6 are passive tags without self-power source. Namely, the IC tags 112-1, 112-2, 112-3 and 112-4 for RFID work by using the electromagnetic waves from the transmission/reception unit 113 as a source of energy, the electromagnetic waves being transmitted from the transmission/reception unit 113 to the IC tags 112-1, 112-2, 112-3 and 112-4 for RFID through the communication sheet structure 111.

Next, described below is a concrete embodiment to which the information management system of the invention is applied.

Figure 9:
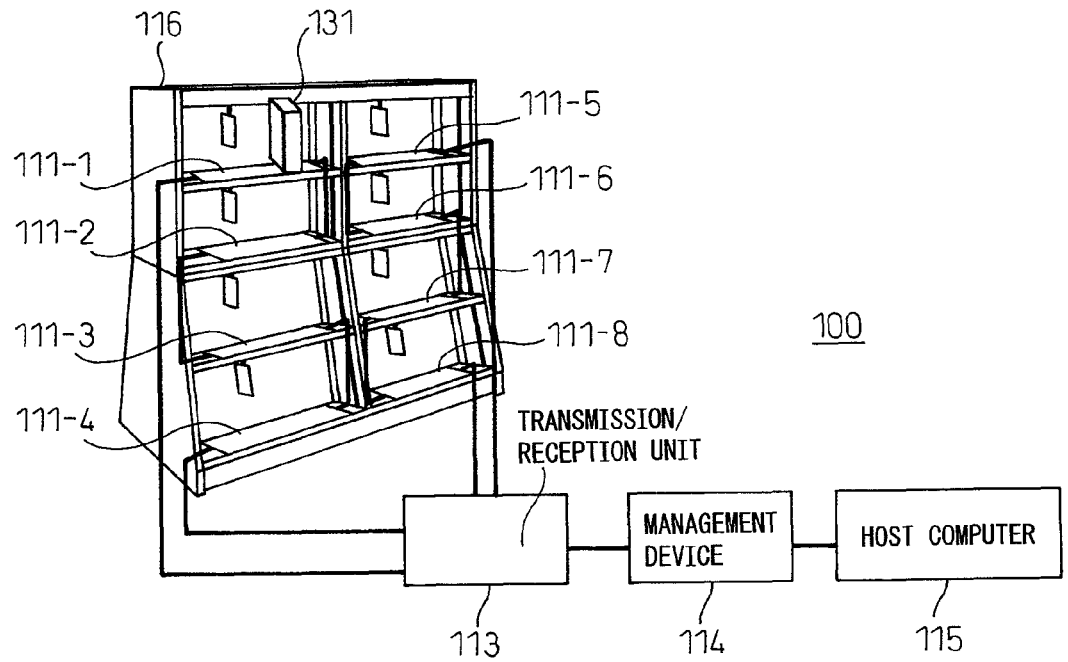
[FIG. 9] is a view illustrating a case where the information management system of the invention is applied to a book management system in a library.
Figure 10:
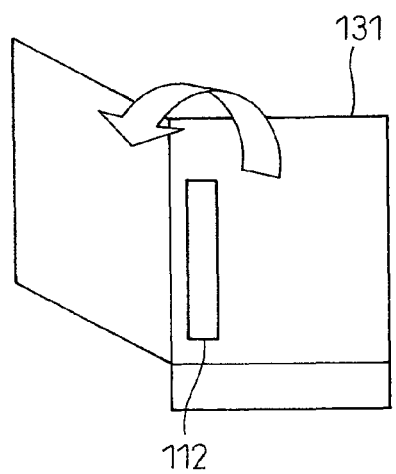
[FIG. 10] is a view showing an example of attaching an IC tag for RFID in the book management system of FIG. 9.

FIG. 9 is a view illustrating a case where the information management system of the invention is applied to a book management system in a library, and FIG. 10 is a view showing an example of attaching an IC tag for RFID in the book management system of FIG. 9.

In the book management system in the library to which the information management system of the invention is applied, the articles to be managed are paper media or electronic media stocked in the library. The paper media may be, for example, books, magazines, newspapers, and a variety of documents while the electronic media may be, for example, CDs, DVDs, BDs (Bru-Ray Discs) and HD-DVDs. In the case of a book as shown, for example, in FIG. 10, the tag 112 for RFID is attached to the spread of a cover of the book 131. The position at where the IC tag for RFID is attached to the article to be managed may be suitably determined by taking into consideration the shape of the article, manner of using it, characteristics or a manner of storage. For example, if a microfilm is to be managed, the IC tag for RFID may be attached to a casing that holds the microfilm therein.

The IC tag for RFID attached to an article (i.e., paper medium or electronic medium) to be managed in the book management system is storing identification information specific to the article, information related to the place of storage, and information related to "for reference only" or not. Any one or more kinds of information may be stored, as required.

Referring to FIG. 9, the communication sheet structures 111-1 to 111-8 are placed on placing surfaces (i.e., shelf surfaces) of a bookshelf 116 on which the articles (i.e., paper media or electronic media) to be managed are to be placed. The communication sheet structures 111-1 to 111-8 are connected, for example, as described with reference to FIGS. 7 and 8, and are connected to the transmission/reception unit 113. The transmission/reception unit 113 connected to the management device 114 will be installed near the management device 114 or in an empty space of the bookshelf 116.

The management device 114 reads information stored in the IC tags for RFID attached to the articles to be managed based on the signals received by the transmission/reception unit 113 through the communication sheet structures 111-1 to 111-8, collates the thus read information related to the articles with the management information that has been registered in advance to the management device 114, and manages the states of the articles by the database. Information to be managed by the database include a variety kinds of information related to identification information, the states of being lent out, states of return, places where they are new present, frequency of use, time of use, and users of articles (i.e., paper media or electronic media). With the identification information of article as a center, these kinds of information are attached thereto, and the whole information is registered to the management device 114. Further, a host computer 115 may be connected to a higher position of the management device 114. For instance, a library network system may be built up to collectively manage, by using the host computer 115, a plurality of libraries of which the management devices 114 are connected to the host computer 115.

Relying on the information collected in the management devices 114 or in the host computer 115, it becomes easy to improve services and efficient use in the libraries as described below.

For example, the management device 114 or the host computer 115 becomes capable of grasping the places where the articles (i.e., paper media or electronic media) are now present relying on the information received through the communication sheet structures 111-1 to 111-8 and the transmission/reception unit 113. Therefore, the management device 114 or the host computer 115 becomes capable of executing such an operation as producing an alarm in case the book is placed on a bookshelf different from the bookshelf on where the book should be stored or producing an alarm when the book has not been returned back to the bookshelf for long periods of time by checking at all times the states of use of the restricted books.

In the corner of the restricted books, further, the books have not, usually, been lent out and have not been managed by reading the bar codes. Therefore, the tendency of use or the frequency of use of the restricted books could not be grasped. The present invention, on the other hand, makes it possible to grasp the frequency of use and the times of use of the restricted books through the communication sheet structures placed on the shelves of the bookshelf, and to manage the restricted books more minutely than the prior art.

Further, based on the information collected in the management device 114 or the host computer 115, the library staff is allowed to easily determine whether to purchase or dispose the articles (i.e., paper media or electronic media) and, specifically, restricted books.

FIG. 11 is a flowchart illustrating a flow of operation of the book management system of FIGS. 9 and 10.

At step S1001, the transmission/reception unit 113 transmits electromagnetic waves toward the communication sheet structures 111-1 to 111-8, and reads management information of the IC tags for RFID through the communication sheet structures on which there are arranged the books 131 to which the IC tags for RFID are attached. The transmission of electromagnetic waves and reading of management information are executed by the transmission/reception unit 113 at step S1001 repetitively in a period of, for example, one second. The information read by the transmission/reception unit 113 is sent to the management device 114.

Next, at step S1002, the management device 114 decides if the paper media or the electronic media are present on the shelves based on the information received from the transmission/reception unit 113. The criterion for deciding the "presence of the paper media or the electronic media" can be adjusted by the intensity of the electromagnetic wave (electric current) transmitted to the communication sheet structures.

However, it is decided if the IC tag for RFID is present in a distance of, for example, not more than 20 cm from the communication sheet structure.

If it is decided at step 1002 that the paper medium or the electronic medium is present on the shelf, the routine proceeds to step S1006. At step S1006, the information that the medium is present is continuously recorded in a memory (not shown) in the management device 114, and "NOT LENT OUT" is displayed on a display (not shown) in the management device 114. After the processing at step S1006, the routine returns back to step S1001.

If it is so decided at step S1002 that no paper medium or electronic medium is present on the shelf, then the routine proceeds to step S1003. At step S1003, the information that no medium is present is recorded in the memory (not shown) in the management device 114, and "LENT OUT" is displayed on the display (not shown) in the management device 114. The routine proceeds to step S1004.

At step S1004, the transmission/reception unit 113 transmits the electromagnetic waves toward the communication sheet structures 111-1 to 111-8 and reads management information from the IC tags for RFID through the communication sheet structures on which there are arranged the books 131 to which the IC tags for RFID are attached. The transmission of electromagnetic waves and reading of management information are executed by the transmission/reception unit 113 at step S1004 repetitively in a period of, for example, one second. The information read by the transmission/reception unit 113 is sent to the management device 114.

Next, at step S1005, the management device 114 decides if the paper media or the electronic media are returned back onto the shelves based on the information received from the transmission/reception unit 113.

If it is decided at step S1005 that the paper media or the electronic media are returned back onto the shelves, the routine proceeds to step S1006. At step 51006, the information that the medium is present is recorded in the memory (not shown) in the management device 114, and "NOT LENT OUT" is displayed on the display (not shown) in the management device 114. Thereafter, the routine returns back to step S1001. The criterion for deciding "if the paper media or the electronic media are turned back onto the shelf" can be adjusted by the intensity of the electromagnetic waves (electric current) transmitted to the communication sheet structures like in the processing at step S1002. It is decided if the IC tag for RFID is present in a distance of, for example, not more than 20 cm from the communication sheet structure.

If it is decided at step 1005 that the paper media or the electronic media have not still been returned back onto the shelf, the routine returns back to step S1003.

When the host computer 115 is connected to a higher position of the management device 114, it is made possible at step S1007 to collectively manage the states where the books 131 to be managed are lent out, states of return, frequency of use and users.

The information management system of the invention can similarly be applied to the systems other than the above book management system.

When the information management system of the invention is applied to, for example, a distribution management system, the articles to be managed are the goods that are to be distributed. The positions for attaching the IC tags for RFID may be suitably determined by taking into consideration the shapes of goods, transit system and the manner of storage, and may, for example, be incorporated in the labels. In the distribution management system, the IC tag for RFID attached to the goods stores identification information specific to the goods, information related to the owner of goods, information related to the destination and information related to the dealer of delivery. One kind or a plurality of kinds of information may be stored, as required. The communication sheet structures may be placed on a working plate on which the goods will be arranged or on the surface of the carrier bed of a transport equipment. The management device reads information stored in the IC tag for RFID attached to the goods to be managed based on the signals received by the transmission/reception unit through the communication sheet structure, collates the information read out concerning the goods with the management information that has been registered in advance in the management device, and manages the states of the goods by the database. The information managed by the database includes various kinds of information, such as identification information of the goods, information related to the state of delivery, date of delivery, source of delivery, destination of delivery, relay point of delivery work, dealer of delivery and means of delivery. With the identification information of goods as a center, these kinds of information are attached thereto, and all of the information is registered to the management device. Further, a host computer 115 may be connected to a higher position of the management device. For instance, a distribution network system may be built up to collectively manage, by using the host computer installed in the main office, a plurality of management devices installed in the local distribution centers or on the transport equipment.

Further, when the information management system of the invention is applied to, for example, a goods management system in a store, the articles to be managed are the goods that are sold in the store. The positions for attaching the IC tags for RFID may be suitably determined by taking into consideration the shapes of goods, transit system and the manner of storage, and may, for example, be incorporated in the price tags. In the goods management system, the IC tag for RFID attached to the goods stores identification information specific to the goods, information related to the places of storage and the like. One kind or a plurality of kinds of information may be stored, as required. The communication sheet structures may be placed on the surface of a display counter on where the goods will be arranged or on the counter surface on where a cash register is installed. The management device reads information stored in the IC tag for RFID attached to the goods to be managed based on the signals received by the transmission/reception unit through the communication sheet structure, collates the information read out concerning the goods with the management information that has been registered in advance in the management device, and manages the state of the goods by the database. The information managed by the database includes various kinds of information, such as identification information of the goods, information related to the prices, places where they are present, purchasers, sales clerks, and date of sale. With the identification information of goods as a center, these kinds of information are attached thereto, and the whole information is registered to the management device. Further, a host computer may be connected to a higher position of the management device. For instance, a sales network system may be built up to collectively manage, by using the host computer installed in the main office, a plurality of management devices installed in the stores.

Further, when the information management system of the invention is applied to, for example, an article information management system in a place of business, the articles to be managed are those articles that are to be used or treated in the place of business. The positions for attaching the IC tags for RFID may be suitably determined by taking into consideration the shapes of articles, mode of use, mode of treatment, transit system and the manner of storage. In the article information management system, the IC tag for RFID attached to the articles stores identification information specific to the article, information related to the place of storage, owner, and department and section. One kind or a plurality of kinds of information may be stored, as required. The communication sheet structures may be placed on a shelf or storehouse on which the articles will be stored or on the surface of a bench on where the articles are to be treated. The management device reads information stored in the IC tag for RFID attached to the article to be managed based on the signals received by the transmission/reception unit through the communication sheet structure, collates the information read out concerning the article with the management information that has been registered in advance in the management device, and manages the state of the goods by the database. The information managed by the database includes various kinds of information, such as identification information of the article, information related to the owner, department and section, place where it is present, frequency of use, time of use and user. With the identification information of article as a center, these kinds of information are attached thereto, and the whole information is registered to the management device. Further, a host computer may be connected to a higher position of the management device. For instance, a sales network system may be built up to collectively manage, by using the host computer installed in the main office, a plurality of management devices installed in the branch stores. More detailed concrete examples of the "article information management system in a place of business" may include management of documents in the offices, management of products in the production steps, management of chemicals or samples in the research facilities, management of tools or materials in the production lines or construction sites, management of instruments, chemicals, samples, doctors and nurses in the sites of medical treatment, management of vehicles in the garages of taxi and bus businesses, and management of articles in the warehouse businesses.

EXAMPLES

The invention will now be described in further detail by way of Examples. In the following Examples and Comparative Examples, the properties were measured according to the methods described below.

(1) Electric Resistance.

The conductor A and the conductor B were measured for their electric resistances by using the "Rorester MP MCP-T350" manufactured by Mitsubishi Kagaku Co.

(2) Relative Dielectric Constant, Dielectric Loss Tangent.

The relative dielectric constant and the dielectric loss tangent at 2.45 GHz were measured by the cylindrical cavity resonator method by using a network analyzer manufactured by Agilent Co.

(3) Evaluation and Judgment Of Communication Performance.

Referring to FIG. 1, two proximity connectors were arranged on the communication sheet structure maintaining a distance r, and a transmission coefficient X at 2.45 GHz was measured by using the network analyzer manufactured by Agilent Co. The distance of the proximity connectors was varied from 10 cm up to 100 cm in a unit of 1 cm. Further, the proximity connectors were the ones having a peak at 2.45 GHz on the communication sheet structure. An average value (Xav.) was calculated from the measured transmission factors X. Very favorable communication performance was attained when Xav. ≥ −30 dB.

(4) Evaluation and Judgment of Read Rate.

A hundred books (each 20 mm thick) to which the IC tags for RFID have been attached were placed on the communication sheet structure, and signals of 30 dBm were transmitted by using a reader/writer to measure the number of the books from which the IC tag information for RFID could be read out. The operation was repeated 10 times to calculate an average value. The average value of not less than 95 books but less than 98 books was regarded to be favorable, and the average value of not less than 98 books was regarded to be very favorable.

Example 1

As the base member, there was used a low-density polyethylene (PE) sheet of a thickness of 2 mm (hard polyethylene sheet manufactured by Shimonoseki Packing Co., hereinafter the same) and as the conductor A, an aluminum foil of 9 μm punched like a lattice was laminated on one surface of the base member. The lattice shape of the conductor A consisted of a wire width of 1 mm and a gap among the wires of 7 mm. As the conductor B, the aluminum foil of 9 μm was laminated on the other surface of the base member so as to cover the whole surface by 100% to thereby fabricate a communication sheet structure. The width of the sheet was selected to be 5 cm which was one-half the wavelength of the electromagnetic waves of about 10 cm at 2.45 GHz, and the length of the sheet was selected to be 100 cm. The results were as shown in Table 1.

Example 2

As the protection layer A and the conductor A, there was obtained a PET fiber woven fabric of a weight of 200 g/m$^2$ by printing a silver paste like a lattice on a PET fiber woven fabric (New-Shelf II manufactured by Kawashima Orimono Cellcon Co.) of a polyethylene terephthalate (PET) fiber woven fabric that possessed an urethane resin laminated thereon. As the base member, there was used a PET fiber nonwoven fabric of a thickness of 2 mm and a weight of 72 g/m$^2$. As the conductor B and the protection layer B, there was used an electromagnetic wave-shielding cloth (ST2050 manufactured by Teijin Fiber Co., hereinafter the same) comprising a PET fiber woven fabric of a weight of 85 g/m$^2$ being plated with copper•nickel. The lattice shape of the conductor A consisted of a wire width of 1 mm and a gap among the wires of 7 mm. They were stuck together by sewing by using a polyester machine thread. The sewing was conducted by using a final sewing machine table, DDL-5530, manufactured by Juki Co. and using a sewing machine needle, DB×1#14 maintaining a stitch length of 3 cm/13 stitches. The width of the sheet was selected to be 5 cm and the length of the sheet was selected to be 100 cm. The results were as shown in Table 1.

Example 3

As the protection layer A and the conductor A, an aluminum foil of 9 μm was laminated on a PET film of 250 μm, and was then treated by etching into the shape of a lattice to prepare a film on which the lattice-like aluminum foil was laminated. The lattice shape of the conductor A consisted of a wire width of 1 mm and a gap among the wires of 7 mm. As the base member, there was used a foamed polypropylene (PP) sheet of a thickness of 2 mm and a relative dielectric constant of 1.4 (F-Cell CP3020 manufactured by Furukawa Denko Co., foaming rate of 67%). As the conductor B and the protection layer B, an aluminum foil of 9 µm was laminated on a PET film of 250 µm to prepare an aluminum foil-laminated film having the whole surface thereof being covered with the conductor B.

By using a table coater, an acrylic adhesive was applied onto one surface of the base member such that the applied amount thereof was 10 g/m². Further, the lattice-like aluminum foil-laminated film that serves as the protection layer A and the conductor A was laminated on the base member on which the acrylic adhesive has been applied in a manner that the conductor A was on the side of the base member, and was adhered thereto by using a calendering machine.

Similarly, the acrylic adhesive was applied onto the other surface of the base member, the aluminum foil-laminated film that serves as the protection layer B and the conductor B was laminated on the base member on which the acrylic adhesive has been applied in a manner that the conductor B was on the side of the base member, and the aluminum foil-laminated film was adhered thereto by using the calendering machine to thereby fabricate a communication sheet structure.

The width of the sheet was selected to be 5 cm which was one-half the wavelength of the electromagnetic waves of about 10 cm at 2.45 GHz, and the length of the sheet was selected to be 100 cm. The results were as shown in Table 2.

Example 4

A communication sheet structure was fabricated in the same manner as in Example 3 but applying the acrylic adhesive by using the table coater onto the lattice-like aluminum foil-laminated film on the side of the protection layer A such that the amount applied thereof was 10 g/m², laminating a polypropylene (PP) sheet of a thickness of 1 mm and a relative dielectric constant of 2.3 (PP Plate manufactured by Sugawara Kohgeisha Co.) as a high dielectric constant layer, and adhering them together by using the calendering machine. The results were as shown in Table 2.

Example 5

The procedure was conducted in the same manner as in Example 4 but changing the high dielectric constant layer into a polystyrene (PSt) sheet of a thickness of 1 mm and a relative dielectric constant of 2.3. The results were as shown in Table 2.

Example 6

The procedure was conducted in the same manner as in Example 4 but changing the high dielectric constant layer into a polyethylene terephthalate (PET) sheet of a thickness of 1 mm and a relative dielectric constant of 3.2. The results were as shown in Table 2.

Comparative Example 1

The procedure was conducted in the same manner as in Example 1 but using the conductor A formed by vapor depositing aluminum instead of using the aluminum foil. The results were as shown in Table 1.

Comparative Example 2

The procedure was conducted in the same manner as in Example 1 but using the base member made from a urea resin sheet instead of using the low-density PE sheet. The results were as shown in Table 1.

Comparative Example 3

The procedure was conducted in the same manner as in Example 1 but selecting the width of the sheet to be 23 cm instead of 5 cm. The results were as shown in Table 1.

TABLE 1

|  |  | Example 1 | Example 2 | Comp. Ex. 1 | Comp. Ex. 2 | Comp. Ex. 3 |
|---|---|---|---|---|---|---|
| Protection layer A | material | — | PET fiber woven fabric | — | — | — |
| Conductor A | material | Al foil | Ag paste | Al vapor deposition | Al foil | Al foil |
|  | resistance Ω/☐ | 0.06 | 0.3 | 3.0 | 0.06 | 0.06 |
| Base member | material | low-density PET sheet | PET fiber nonwoven fabric | low-density PE sheet | urea resin sheet | low-density PE sheet |
|  | relative dielectric constant | 2.3 | 1.8 | 2.3 | 7.0 | 2.3 |
| Conductor B | material | Al foil | Cu•Ni plating | Al foil | Al foil | Al foil |
|  | resistance Ω/☐ | 0.01 | 0.3 | 3.0 | 0.01 | 0.01 |
| Protection layer B | material | — | PET fiber woven fabric | — | — | — |
| Communication sheet | width (cm) | 5 | 5 | 5 | 5 | 23 |
|  | communication performance | good | good | poor | poor | poor |

TABLE 2

| | | Example 3 | Example 4 | Example 5 | Example 6 |
|---|---|---|---|---|---|
| High dielectric constant layer A | material | — | PP sheet | PSt sheet | PET sheet |
| | relative dielectric constant | — | 2.3 | 2.3 | 3.2 |
| | dielectric loss tangent | — | 0.0006 | 0.002 | 0.001 |
| | thickness (mm) | — | 1.0 | 1.0 | 1.0 |
| Protection layer A | material | PET film | PET film | PET film | PET film |
| | thickness (mm) | 0.25 | 0.25 | 0.25 | 0.25 |
| Conductor A | material | Al foil | Al foil | Al foil | Al foil |
| | resistance $\Omega/\square$ | 0.06 | 0.06 | 0.06 | 0.06 |
| Base member | material | foamed PP sheet, foaming rate 67% | foamed PP sheet, foaming rate 67% | foamed PP sheet, foaming rate 67% | foamed PP sheet, foaming rate 67% |
| | relative dielectric constant | 1.4 | 1.4 | 1.4 | 1.4 |
| Conductor B | material | Al foil | Al foil | Al foil | Al foil |
| | resistance $\Omega/\square$ | 0.01 | 0.01 | 0.01 | 0.01 |
| Protection layer B | material | PET film | PET film | PET film | PET film |
| | thickness (mm) | 0.25 | 0.25 | 0.25 | 0.25 |
| Communication sheet | width (cm) | 5 | 5 | 5 | 5 |
| | communication performance | good | good | good | good |
| | read rate | good | very good | very good | very good |

Industrial Applicability:

The communication sheet structure for use in the RFID system of the present invention has a frequency band of from 800 MHz up to 10 GHz, can be easily introduced and installed on the existing shelves, and can be used for the management of book stocks in the libraries, as well as management of documents in the offices, management of goods in the stores, management of chemicals and samples in the research facilities, management of distribution, management of products in the production steps, management of tools and materials in the production lines and in the construction sites, management of instruments, chemicals, samples, doctors and nurses in the sites of medical treatments, management of vehicles in the garages of taxi and bus businesses, and management of articles in the warehouse businesses.

The invention claimed is:

1. A communication sheet structure comprising at least three layers of a conductor layer A, a base member layer and a conductor layer B described below, which are laminated in order, wherein the size of said communication sheet structure in the direction of width thereof at right angles with the direction in which the transmitted electromagnetic waves travel in a plane thereof is nearly equal to a natural number of times of one-half the wavelength of said transmitted electromagnetic waves so as to establish a resonating state in said direction of width:

conductor layer A: a layer in which continuous, conducting portions A and nonconducting portions A are present, said conducting portions A having an electric resistance of not larger than 1 $\Omega/\square$;

base member layer: a layer of a resin molded body or a fiber structure having a relative dielectric constant of 1.0 to 5.0 at a frequency of 800 MHz to 10 GHz;

conductor layer B: a layer in which a conducting portion B is present over not less than 90% of the area thereof, said conducting portion B having an electric resistance of not larger than 1 $\Omega/\square$.

2. The communication sheet structure according to claim 1, wherein said communication sheet structure is of the shape of a strip having a long side in the direction in which the transmitted electromagnetic waves travel and a short side in said direction of width.

3. The communication sheet structure according to claim 1, wherein the size in said direction of width is nearly equal to one-half the wavelength of said transmitted electromagnetic waves so that said transmitted electromagnetic waves become plane waves.

4. The communication sheet structure according to claim 1, wherein the conducting portions A in said conductor layer A are of the shape of a lattice having a wire width of 0.5 mm to 1.5 mm and a gap among the wires of 5 mm to 10 mm.

5. The communication sheet structure according to claim 1, wherein said base member layer comprises a foamed polypropylene resin or foamed polyethylene resin having a voidage of 50 to 85%.

6. The communication sheet structure according to claim 1, further comprising an input/output interface for inputting and outputting said transmitted electromagnetic waves in a predetermined direction of travel.

7. The communication sheet structure according to any one of claims 1 to 6, wherein a high dielectric constant layer is laminated on said conductor layer A, said high dielectric constant layer having a relative dielectric constant larger than that of the base member layer and having a dielectric loss tangent of not more than 0.001.

8. The communication sheet structure according to claim 7, wherein said high dielectric constant layer has a relative dielectric constant of from 2.0 to 10.0.

9. The communication sheet structure according to claim 8, further comprising a protection layer A of a thickness of 0.02 to 0.3 mm between said conductor layer A and said high dielectric constant layer.

10. An information management system comprising an IC tag for storing information related to an article which is to be managed, the communication sheet structure described in claim 1, and a transmission/reception unit which transmits electromagnetic waves toward said communication sheet structure and receives signals from said IC tag through said communication sheet structure.

11. The information management system according to claim 10, further comprising a management device which reads information related to said article based on said signals received by said transmission/reception unit, and manages the state of said article by the database based on the management information that has been registered in advance and the information that is read concerning the article.

12. The information management system according to claim 11, wherein said communication sheet structure includes an input/output interface connected to said transmission/reception unit or to another communication sheet structure to input and output signals.

13. The information management system according to claim 10, wherein said communication sheet structure is placed on a surface on where said article to which said IC tag is attached is to be arranged.

* * * * *